US011352228B2

(12) United States Patent
Gutierrez Garcia et al.

(10) Patent No.: US 11,352,228 B2
(45) Date of Patent: *Jun. 7, 2022

(54) UNWINDING OR WINDING ROLLS OF PRINT SUBSTRATE

(71) Applicant: HEWLETT-PACKARD DEVELOPMENT COMPANY, L.P., Spring, TX (US)

(72) Inventors: Daniel Gutierrez Garcia, Barcelona (ES); Roger Terradellas Callau, San Cugat del Valles (ES); Carlos Felip Aragon, Sant Cugat del Valles (ES); Raimon Castells De Monet, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/558,122

(22) Filed: Sep. 1, 2019

(65) Prior Publication Data

US 2019/0382226 A1     Dec. 19, 2019

Related U.S. Application Data

(63) Continuation of application No. 15/502,289, filed as application No. PCT/US2014/051687 on Aug. 19, 2014, now Pat. No. 10,442,646.

(51) Int. Cl.
*B65H 16/02*     (2006.01)
*B65H 18/10*     (2006.01)
(Continued)

(52) U.S. Cl.
CPC ......... *B65H 16/021* (2013.01); *B65H 16/103* (2013.01); *B65H 18/021* (2013.01);
(Continued)

(58) Field of Classification Search
CPC ...... B65H 16/00; B65H 16/02; B65H 16/021; B65H 16/023; B65H 16/024; B65H 16/04;
(Continued)

(56) References Cited

U.S. PATENT DOCUMENTS 4,395,152 A   7/1983  Hendrischk
4,984,914 A   1/1991  Hayakawa
(Continued)

FOREIGN PATENT DOCUMENTS

CN   201012868 Y   1/2008
CN   103282294 A   9/2013
(Continued)

*Primary Examiner* — Michael R Mansen
*Assistant Examiner* — Raveen J Dias
(74) *Attorney, Agent, or Firm* — HP Inc. Patent Department

(57) ABSTRACT

In one example, a device for unwinding or winding multiple rolls of print substrate includes multiple spindles each to hold a roll of print substrate and a differential operatively connected to one end of each spindle. The spindles are aligned with one another lengthwise along a spindle axis and the differential is to output torque along a differential axis offset from the spindle axis to turn the spindles on the first axis.

17 Claims, 12 Drawing Sheets

(51) Int. Cl.
*B65H 16/10* (2006.01)
*B65H 18/02* (2006.01)
*F16H 37/08* (2006.01)
*F16H 48/08* (2006.01)
*B41J 15/22* (2006.01)

(52) U.S. Cl.
CPC ........ *B65H 18/106* (2013.01); *F16H 37/0813* (2013.01); *F16H 48/08* (2013.01); *B41J 15/22* (2013.01); *B65H 2301/23* (2013.01); *B65H 2301/41342* (2013.01); *B65H 2301/41366* (2013.01); *B65H 2301/41461* (2013.01); *B65H 2403/483* (2013.01); *B65H 2801/36* (2013.01)

(58) Field of Classification Search
CPC ...... B65H 16/08; B65H 16/028; B65H 16/10; B65H 16/103; B65H 18/00; B65H 18/02; B65H 18/021; B65H 18/026; B65H 18/04; B65H 18/10; B65H 2301/23; B65H 2301/41366; B65H 2403/483; B41J 15/00; B41J 15/02; B41J 15/04; B41J 15/18; B41J 15/22; F16H 37/08; F16H 37/0806; F16H 37/0813; F16H 37/0826; F16H 37/0833; F16H 48/00; F16H 48/08; F16H 48/10; F16H 2048/02; F16H 2048/04; F16H 2048/082; F16H 2048/102
See application file for complete search history.

(56) References Cited

U.S. PATENT DOCUMENTS

| | | | |
|---|---|---|---|
| 5,025,532 A | 6/1991 | Lytton et al. | |
| 5,085,532 A * | 2/1992 | Surya | B41J 3/54 192/41 R |
| 5,838,354 A | 11/1998 | Yamada et al. | |
| 6,042,228 A | 3/2000 | Yamada et al. | |
| 6,168,324 B1 | 1/2001 | Lever | |
| 6,217,167 B1 | 4/2001 | Wen | |
| 6,398,360 B1 | 6/2002 | Brewington et al. | |
| 7,120,381 B2 | 10/2006 | Matsuoka | |
| 7,243,917 B2 * | 7/2007 | Knierim | B65H 9/002 271/228 |
| 7,798,631 B2 | 9/2010 | McConville et al. | |
| 9,670,016 B1 * | 6/2017 | Chou | B65H 85/00 |
| 10,442,646 B2 * | 10/2019 | Gutierrez Garcia | F16H 48/08 |
| 11,148,893 B2 * | 10/2021 | Philipse | B65H 16/106 |
| 2003/0020230 A1 | 1/2003 | Williams | |
| 2004/0022568 A1 | 2/2004 | Menendez et al. | |
| 2007/0029436 A1 * | 2/2007 | Gaines | B32B 41/00 242/599.3 |
| 2008/0131185 A1 * | 6/2008 | Kim | B65H 19/123 400/605 |
| 2009/0027436 A1 | 1/2009 | McConville et al. | |
| 2011/0017082 A1 | 1/2011 | Castells et al. | |
| 2011/0063644 A1 * | 3/2011 | Niihara | B41J 15/04 358/1.12 |
| 2013/0292507 A1 | 11/2013 | Castells et al. | |
| 2013/0298790 A1 * | 11/2013 | Castells | B41J 15/22 101/407.1 |
| 2014/0097288 A1 | 4/2014 | Yanase | |
| 2014/0186086 A1 * | 7/2014 | Yato | B65H 16/028 400/611 |
| 2014/0239581 A1 | 8/2014 | Le | |
| 2014/0292981 A1 * | 10/2014 | Matsumoto | B65H 16/02 347/104 |
| 2015/0343730 A1 | 12/2015 | Marchini | |
| 2016/0031666 A1 * | 2/2016 | Cheng | B65H 5/068 271/226 |
| 2016/0067986 A1 * | 3/2016 | Ishikawa | B41J 15/046 347/104 |

FOREIGN PATENT DOCUMENTS

| | | | |
|---|---|---|---|
| GB | 930247 | 7/1963 | |
| JP | 53031065 | 3/1978 | |
| JP | S53-031065 | 3/1978 | |
| JP | H09-286151 | 11/1997 | |
| WO | WO-2012096665 | 7/2012 | |
| WO | WO-2012096665 A1 * | 7/2012 | ........... B65H 18/106 |

* cited by examiner

UNWINDING OR WINDING ROLLS OF PRINT SUBSTRATE

CROSS REFERENCE TO RELATED APPLICATIONS

This is a continuation of U.S. application Ser. No. 15/502,289, having a national entry date of Feb. 7, 2017, which is a national stage application under 35 U.S.C. § 371 of PCT/US2014/051687, filed Aug. 19, 2014, which are both hereby incorporated by reference in their entirety.

BACKGROUND

In some printers that print on a web of print substrate, a supply roll of print substrate web is held on a spindle and unwound to supply web to the printer. In some printers that print on a web of print substrate, a take-up roll is held on a spindle and wound to take-up web output from the printer. Sometimes multiple rolls of print substrate web are unwound or wound in parallel.

DRAWINGS

The same part numbers designate the same or similar parts throughout the figures.

DESCRIPTION

For narrower print substrates the productivity of large format printers is improved by printing on substrates from two rolls at the same time. This technique is commonly referred to as parallel roll printing. Currently, printers capable of parallel roll printing with a single drive shaft utilize a spindle assembly with an in-line differential to distribute torque from the drive shaft to a pair of co-axial spindles. Both rolls must be loaded on the spindle assembly outside the printer and then the loaded assembly installed in the printer. It is difficult for a single operator to load the rolls and install the loaded assembly. Also, standard carts and lifters are not good at handling a spindle assembly loaded with two print substrate rolls, particularly for heavier rolls.

A new spindle assembly has been developed in which each spindle may be loaded and installed in the printer independently of the other spindle. In one example, co-axial spindles are operatively connected to a differential that is offset from the spindle axis. The offset differential enables the use of spindles that can be easily disconnected from the differential and removed from the assembly independently of the other spindle. Hence, each substrate roll for parallel roll printing may be loaded and unloaded individually, making it much easier for a single operator to load and unload the rolls and with standard carts and lifters for heavier rolls. In addition, heavier rolls may be loaded on each spindle because (1) the operator only needs to handle one roll at time and (2) there is no in-line structural connection between the spindles that must support the both rolls during loading and unloading.

The examples shown in the figures and described herein illustrate but do not limit the invention, which is defined in the Claims following this Description.

As used in this document, a "differential" means a gear assembly or other device connecting co-axial spindles to a drive mechanism; and a "printer" means any printing device.

Figure 1:
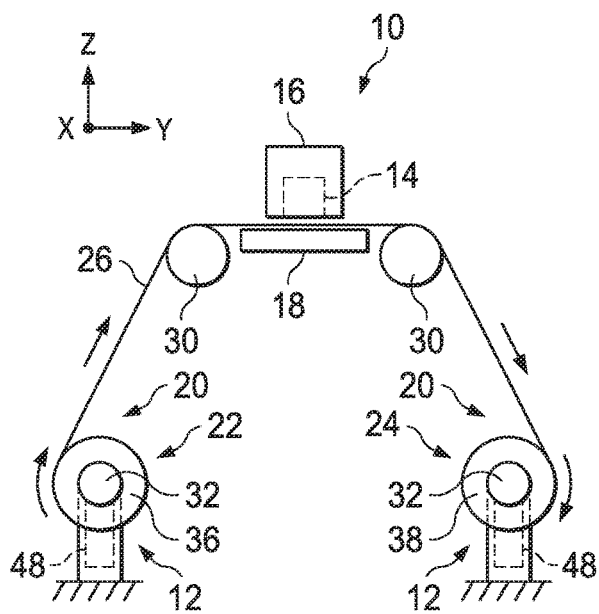
FIGS. 1-3 are elevation and plan view diagrams illustrating a printer implementing one example of a spindle assembly for unwinding or winding multiple rolls of print substrate.
Figure 2:
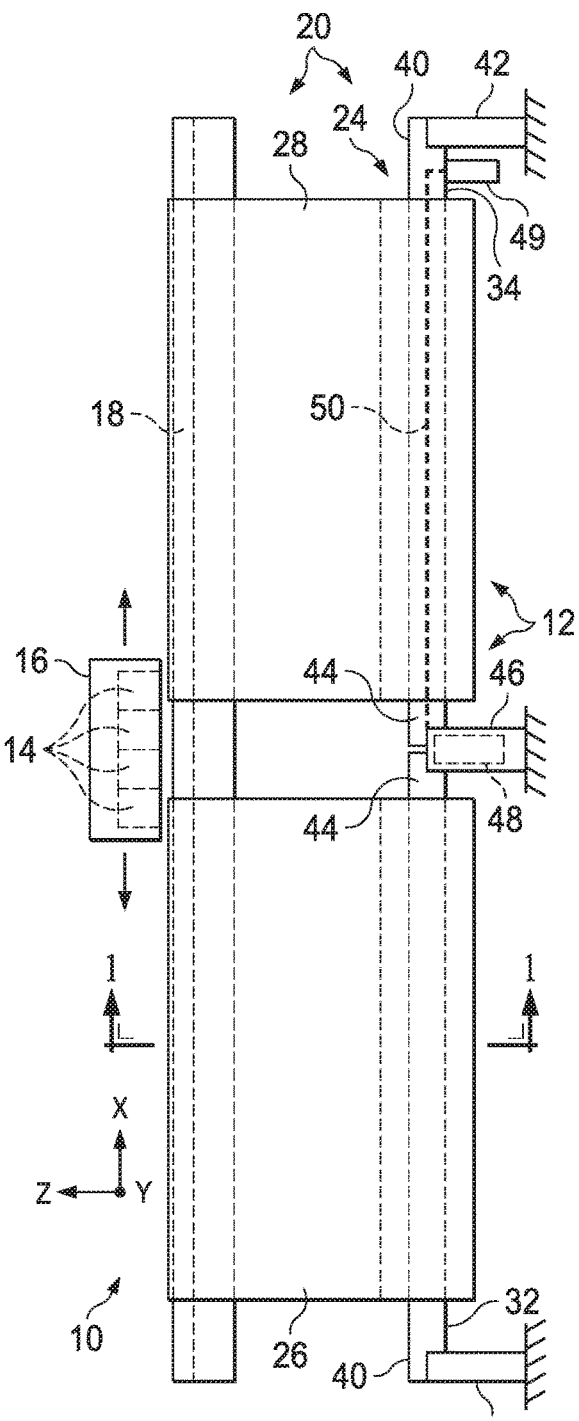
Figure 3:
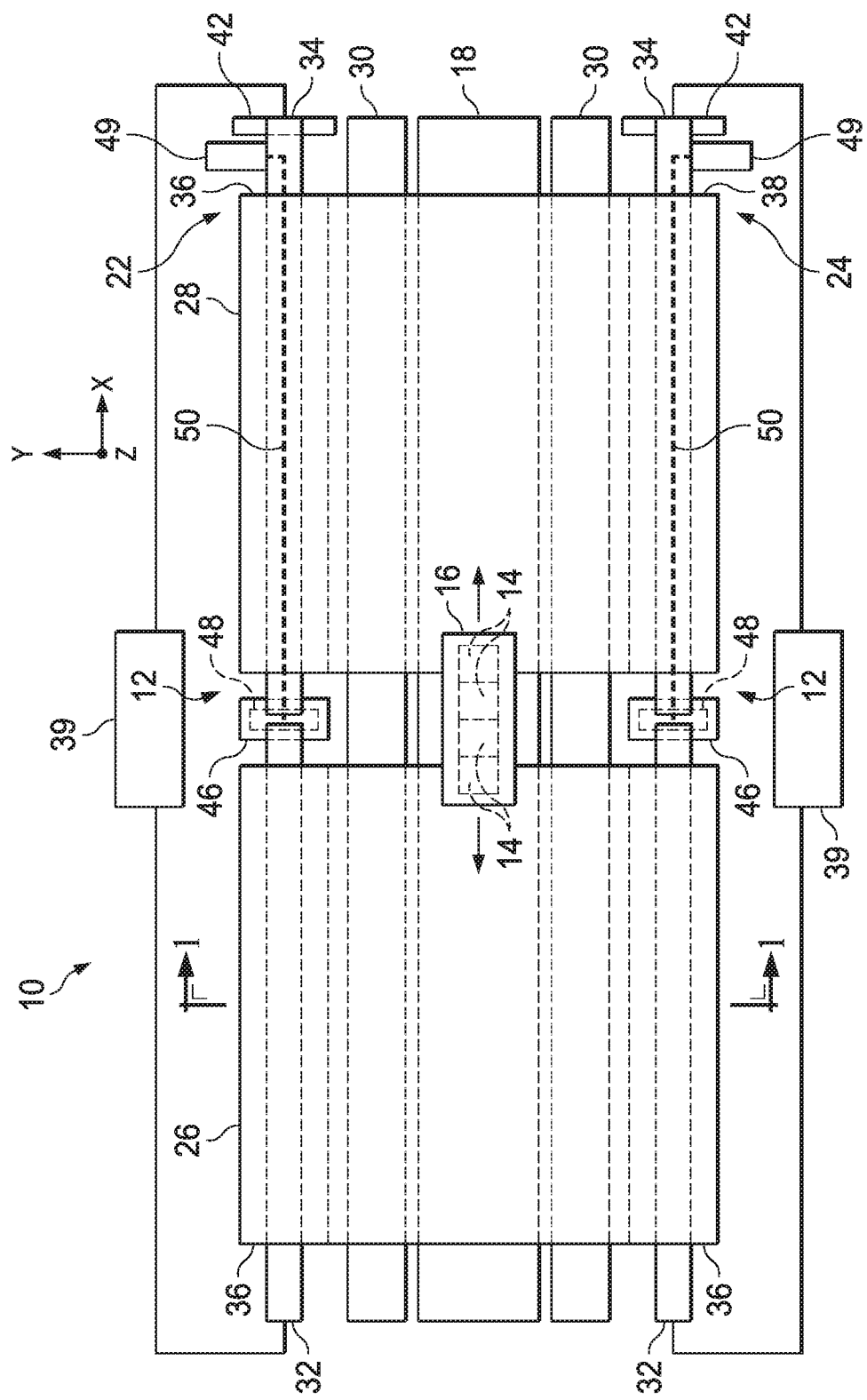

FIGS. 1-3 illustrate a roll-to-roll printer 10 implementing one example of a spindle assembly 12 for unwinding and winding multiple rolls of print substrate. Referring to FIGS. 1-3, printer 10 includes a group of multiple pens 14 for dispensing ink or other printing fluid. Pens 14 are mounted on a carriage 16 over a platen 18. A substrate transport system 20 includes a supply 22 and a take-up 24. Two parallel paper or other print substrate webs 26, 28 extend from supply 22 over platen 18 and guide rollers 30 to take-up 24. Pens 14 are scanned back and forth on carriage 16 across the width of substrates 26, 28 as they pass over platen 18. The inkjet printer 10 shown in FIGS. 1-3 is just one example of a printer in which a spindle assembly 12 may be implemented. Examples of the new spindle assembly may be implemented in other types of printers.

Print substrate supply 22 includes co-axial spindles 32, 34 holding print substrate rolls 36, 38. While any suitable mechanism may be used to hold a substrate roll on a spindle, a pneumatic actuator 39 is commonly used in commercial and industrial printer spindles to grip (and release) the substrate roll on the spindle. Each supply spindle 32, 34 is supported on outboard end 40 by outboard supports 42 and on inboard end 44 by an inboard support 46. Supply 22 also includes a motor 49 at the outboard end 40 of one supply spindle 34 and a differential 48 at the inboard end 44 of both spindles 32, 34. Differential 48 is also supported by center support 46. Each support 42, 46 may be part of the printer, mounted to the printer chassis for example, or a separate part supported directly by the floor on which the printer sits.

Motor 49 turns a driveline 50 inside spindle 34. Driveline 50 is connected to differential 48. Driveline 50 turns on the same axis as spindles 32, 34. Differential 48 is not in-line with spindles 32, 34 and driveline 50. Rather, differential 48 is offset from spindles 32, 34 and driveline 50. As described in detail below, torque is input to differential 48 around the spindle axis through driveline 50, redirected through differential 48 to a second, differential axis parallel to but offset from the spindle axis, and then output around the spindle axis to both spindles 32, 34.

For printers that wind the printed substrate on to a take-up roll such as printer 10 shown in FIGS. 1-3, the take-up 24 includes co-axial spindles 32, 34 holding print substrate take-up rolls 36, 38. The structure and operation of take-up 24 is the same as supply 22. Each take-up spindle 32, 34 is supported on the outboard end 40 with supports 42 and on the inboard end 44 with an inboard support 46. Take-up 24 also includes a motor 49 at the outboard end 40 of spindle 34 and a differential 48 at the inboard end 44 of both spindles 32, 34. Motor 49 turns a driveline 50 inside spindle 34 connected to differential 48. Driveline 50 turns on the same axis as spindles 32, 34 and differential 48 is not in-line with spindles 32, 34. Torque is input to differential 48 around the spindle axis through driveline 50, redirected through differential 48 to a second axis parallel to but offset from the spindle axis, and then output around the spindle axis to both spindles 32, 34.

Figure 4:
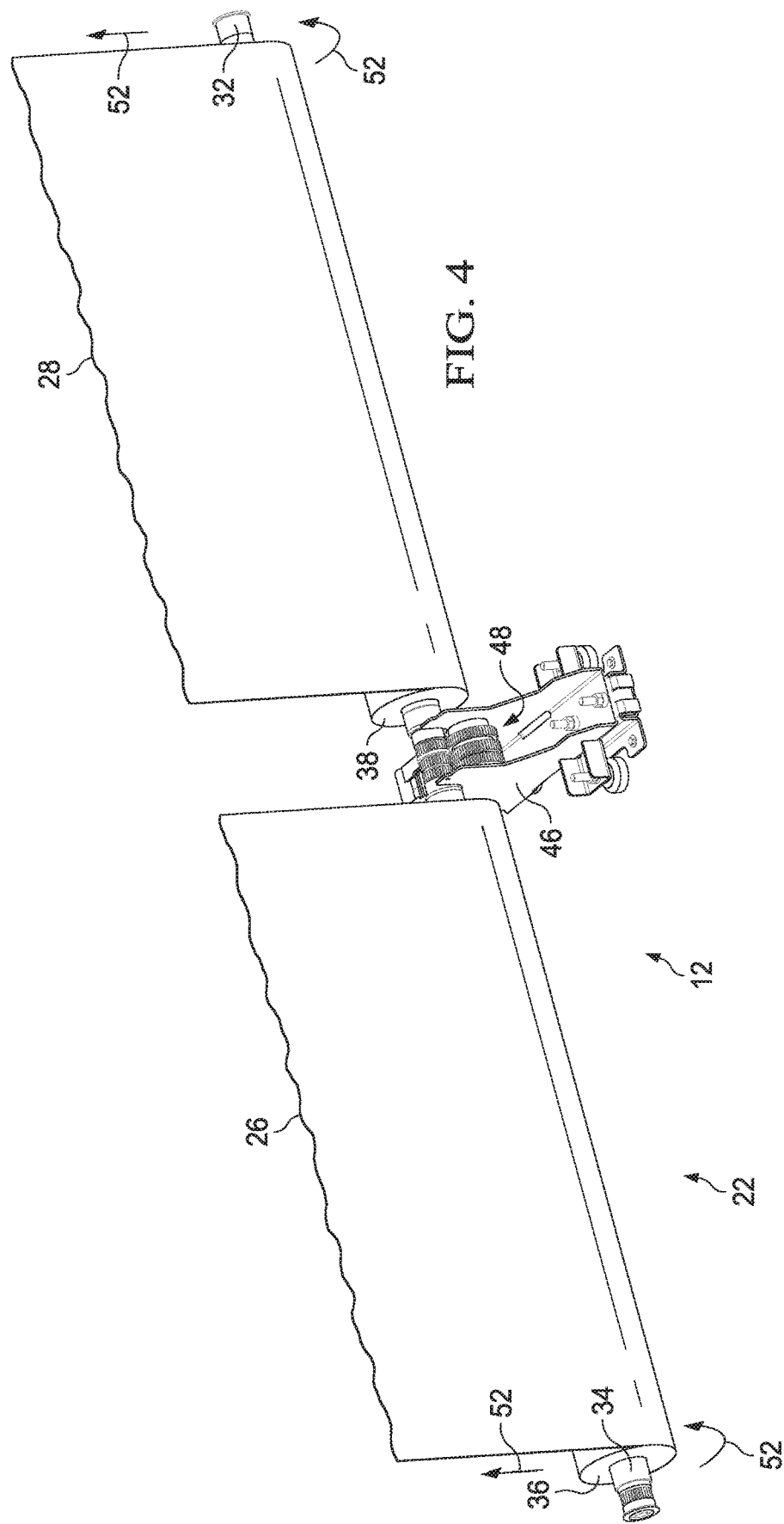
FIGS. 4 and 5 illustrate a web supply and a web take-up, respectively, implementing one example of a spindle assembly.
Figure 5:
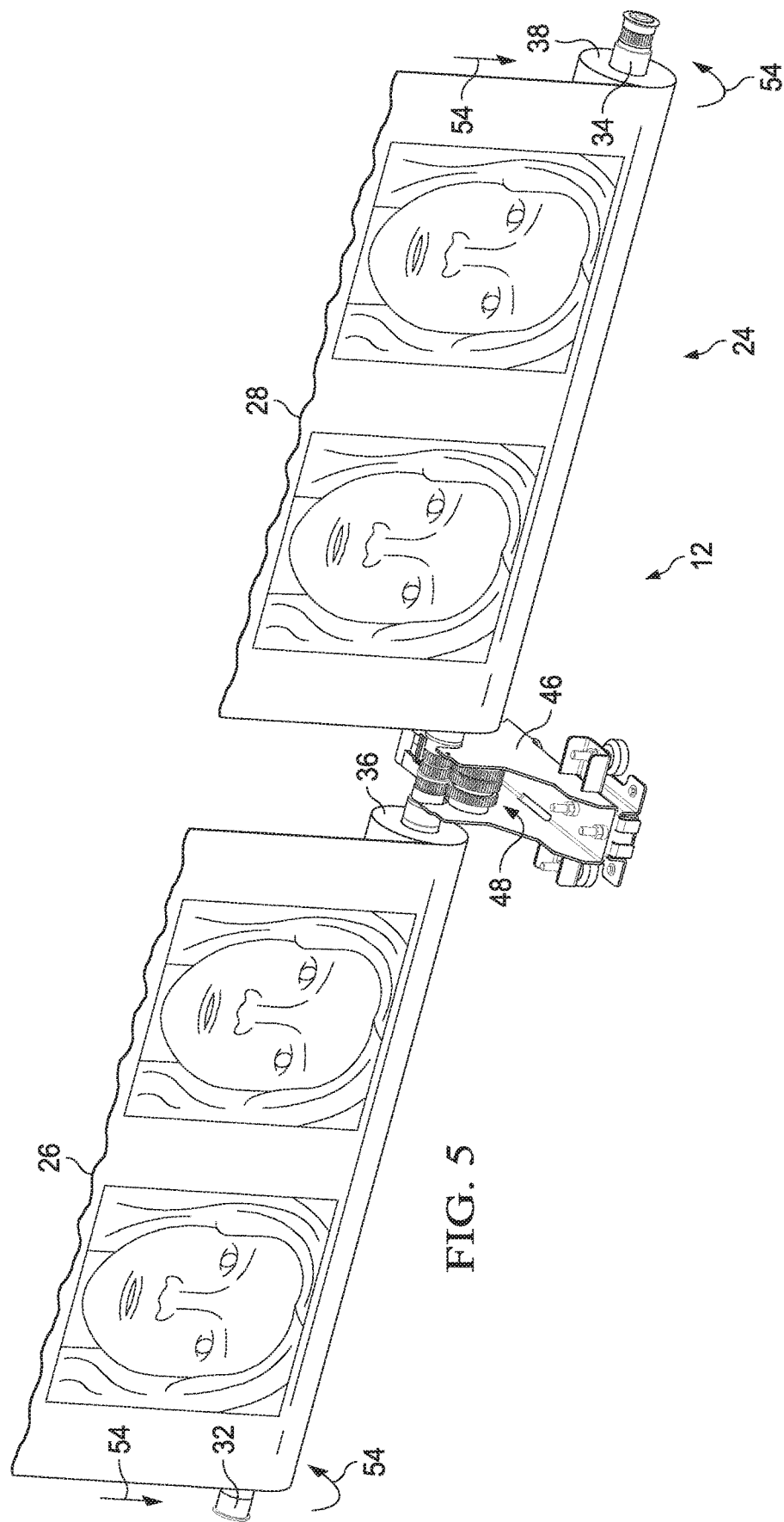
Figure 6:
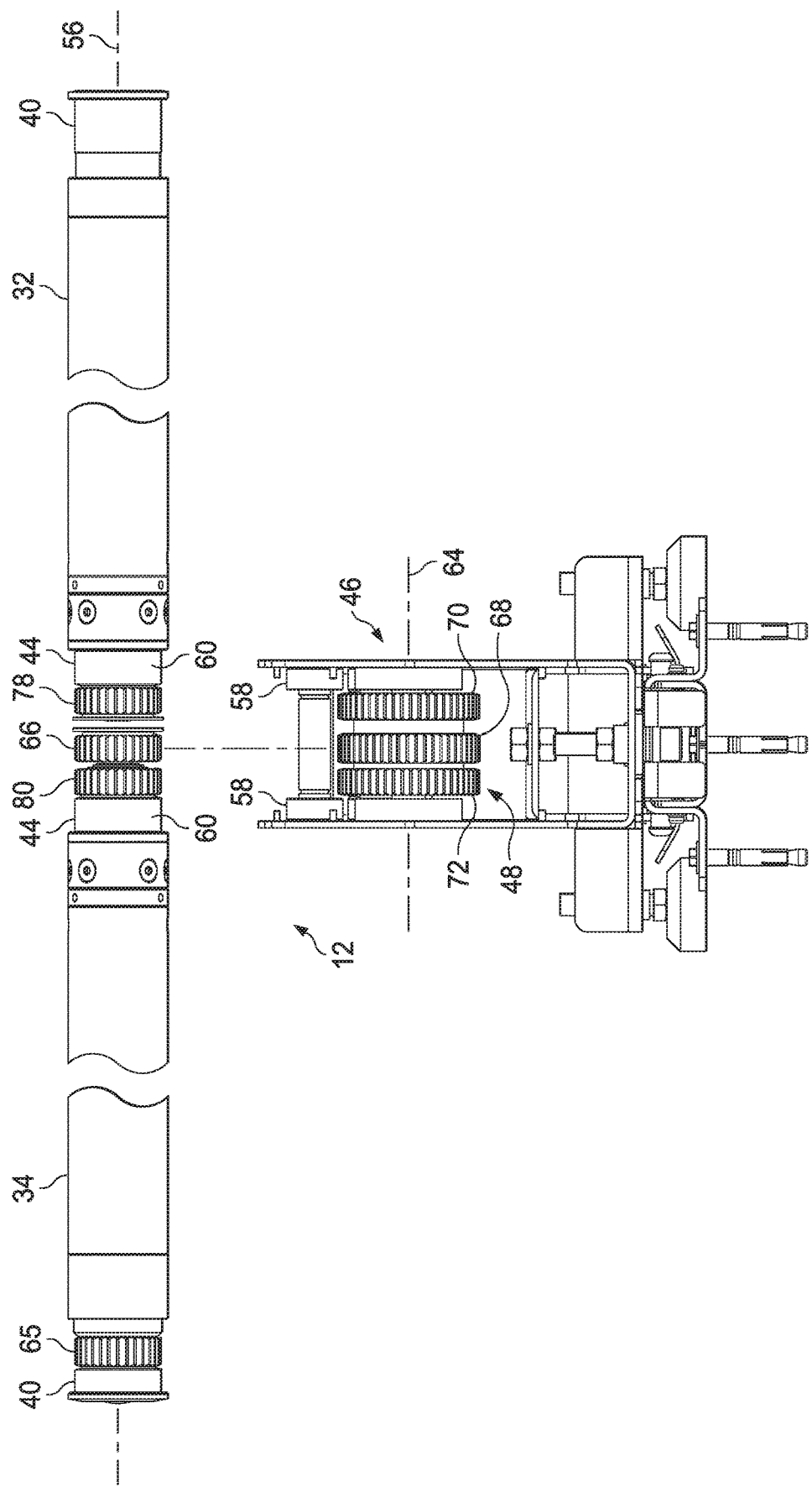
FIGS. 6-8 illustrate the spindle assembly from FIGS. 4 and 5 in more detail.
Figure 7:
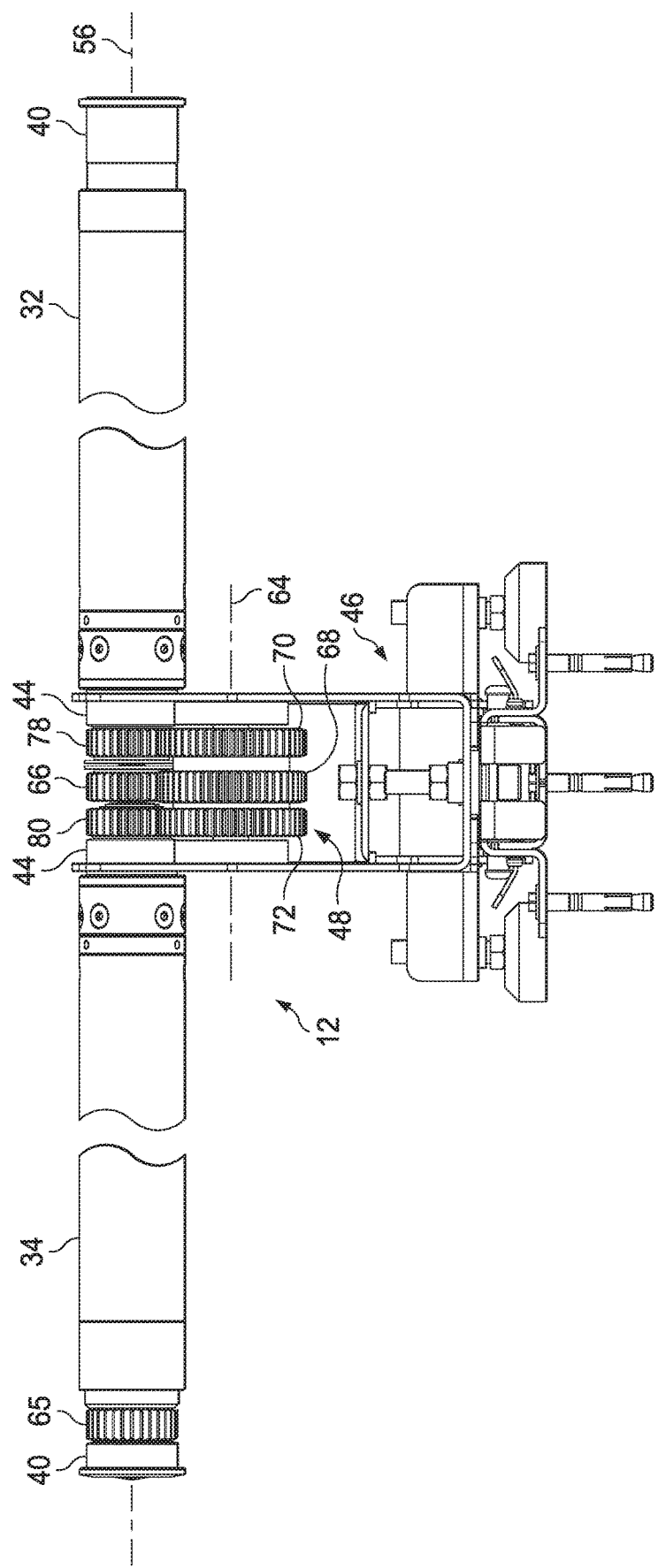
Figure 8:
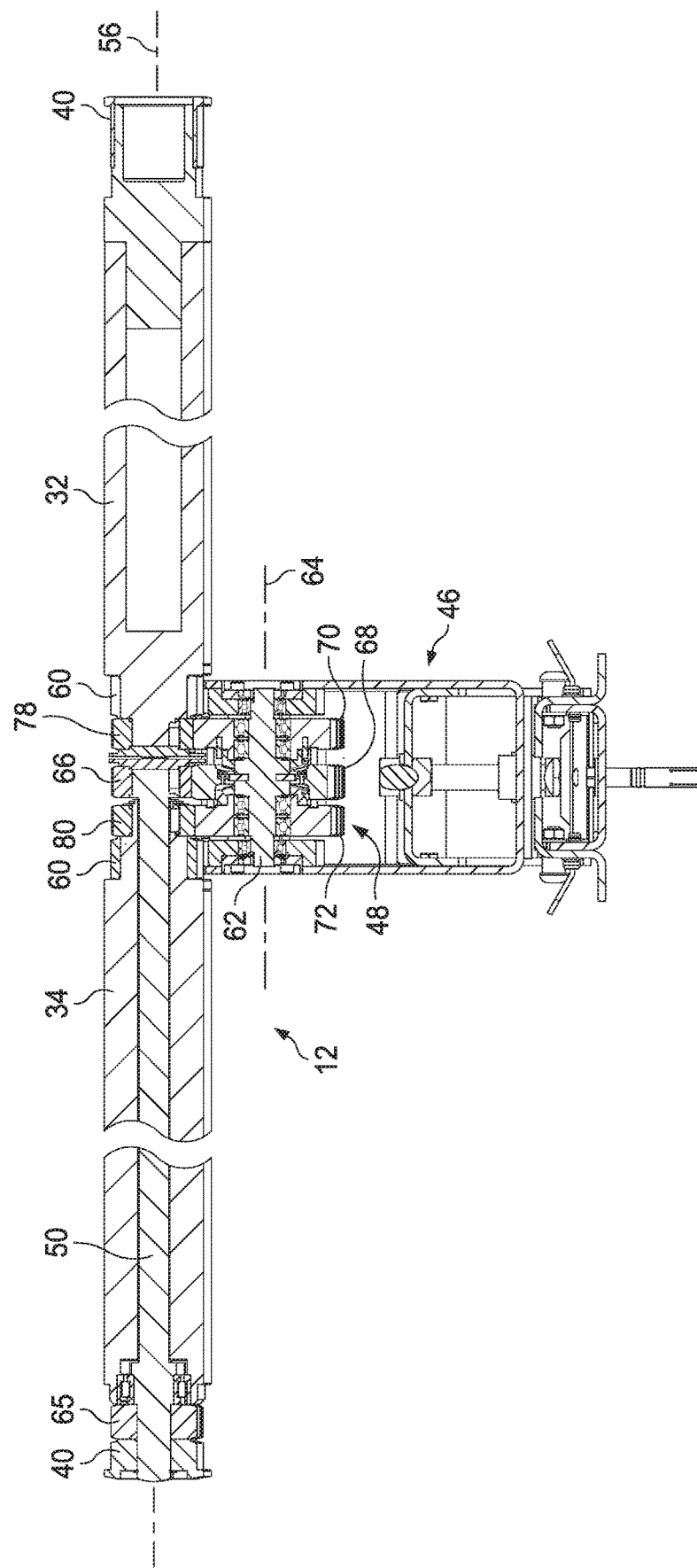

FIGS. 4 and 5 illustrate a web supply 22 and web take-up, respectively, implementing one example of a spindle assembly 12. In FIG. 4, print substrate webs 26, 28 are being fed from rolls 36, 38 into the printer, as indicated by arrows 52. In FIG. 5, printed substrate webs 26, 28 are being taken up on rolls 36, 38, as indicated by arrows 54. FIGS. 6-8 are close-up views of differential 48 and inboard support 46 in spindle assembly 12. Referring to FIGS. 4-8, spindles 32, 34 are aligned with one another lengthwise along a first, spindle axis 56 on which the spindles turn to unwind or wind substrate webs 26, 28. In the example shown, rollers 58 on axles 59 (FIG. 6) in support 46 support the inboard end 44 of each spindle 32, 34 along a bearing surface 60 to provide rolling surfaces that help accurately position the spindles over differential 48. Only two of the four rollers 58 are visible in FIG. 6. All four rollers 58 are visible in FIGS. 10 and 11 described below. Thus, in this example, the weight at the inboard end 44 of each spindle 32, 34 is supported directly by support 46. While it might be possible to support the weight at the inboard end of each spindle through differential 48, usually spindle ends 44 will be supported directly on inboard support 46 to reduce loading on differential 48 and other components in the spindle drive train.

Differential 48 is mounted to support 46 on an axle 62 (FIG. 8) along a second, differential axis 64. Differential axis 64 is parallel to and offset from spindle axis 56. Each spindle 32, 34 is driven through differential 48 by a driveline 50 (FIG. 8) configured, in this example, as a single shaft that turns on spindle axis 56 inside spindle 34. A motor turns driveline 50, for example through a gear 65 on the outboard end of driveline 50. A gear 66 on the inboard end of driveline 50 inputs torque to differential 48 through an input gear 68. Other suitable driveline configurations are possible. For example, driveline 50 may include multiple parts connected between motor 49 and gear 66 rather than the single shaft shown in the figures. Although not specifically called out, differential axle 62, driveline 50 and the other rotating parts of spindle assembly 12 are supported with a suitable bearing, bushing or other structure that enables rotation.

Figure 9:
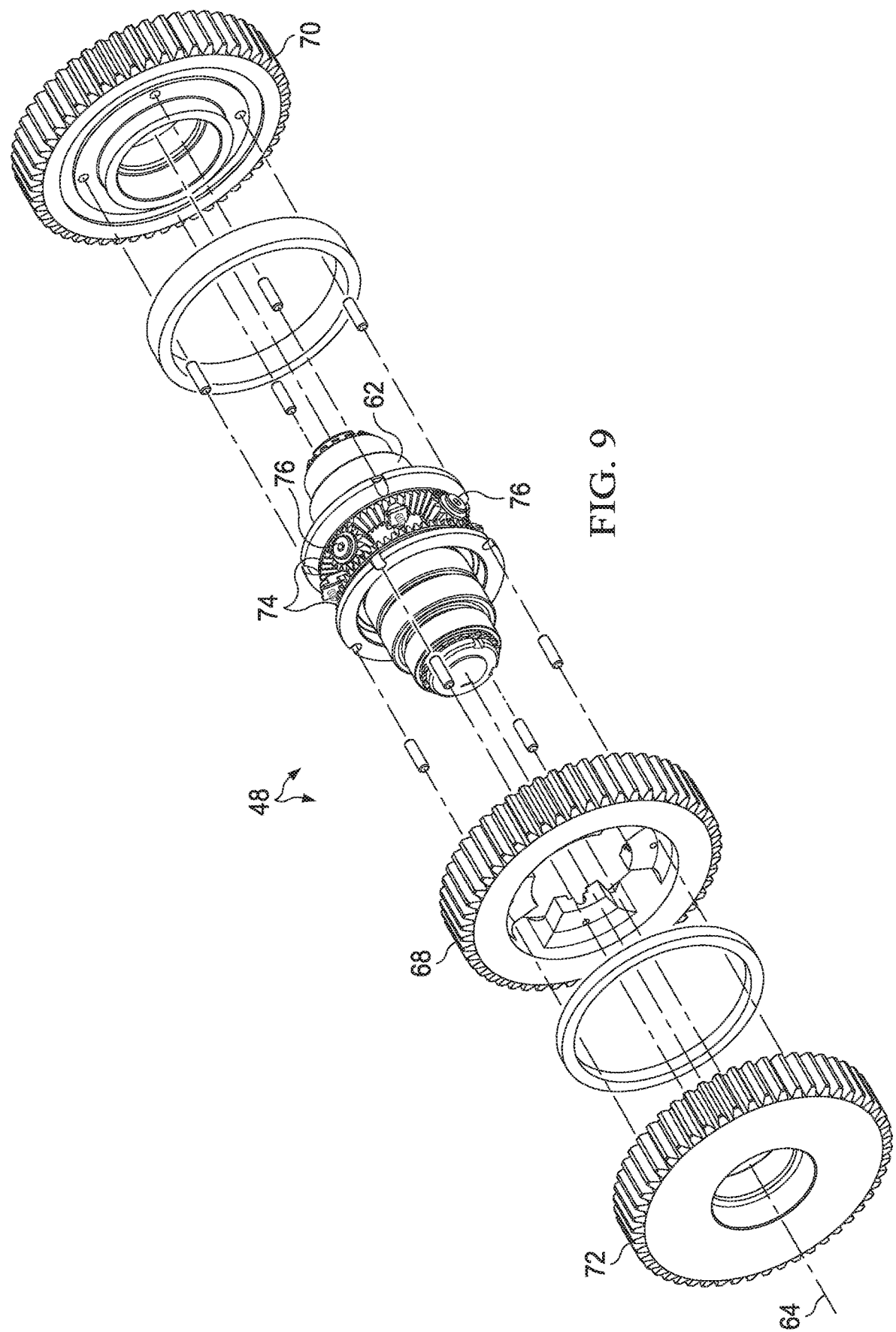
FIG. 9 is an exploded view showing one example of a differential in the spindle assembly of FIGS. 4-8.

Referring now also to FIG. 9, input gear 68 in differential 48 is connected to output gears 70, 72, for example through bevel gears 74 and 76. Differential output gears 70, 72 drive corresponding gears 78, 80 on spindles 32, 34. The differential gear assembly shown in FIGS. 6-8 is just one example for differential 48. Any suitable device may be used to provide the differential function including, for another example, a ball differential. Also, while spindles 32, 34 are the same length in the example shown, different length spindles 32, 34 may be used.

In the example shown, inboard support 46 includes a base 82 and an anchor 84. As shown in FIGS. 4-8, the ends 44 of spindles 32, 34 and differential 48 are mounted to body 82. Body 82 rests on the floor on a tripod of padded feet 86. Body 82 may also be attached to an anchor 84 which is bolted or otherwise affixed to the floor to help stabilize support 46. In other examples, base 82 may be anchored to or otherwise support by the printer chassis (rather than supported directly on the floor as shown).

Figure 10:
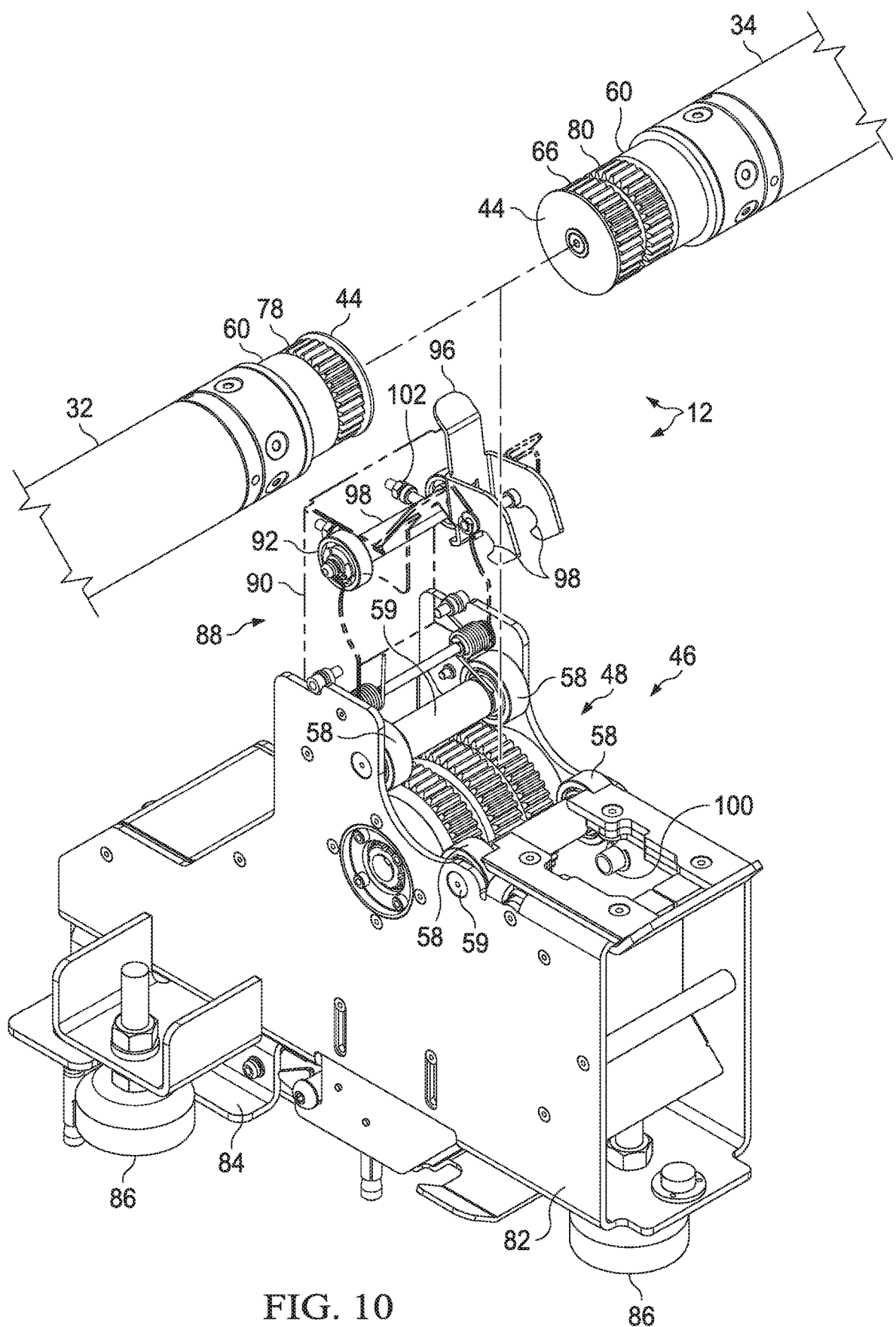
FIGS. 10-13 are close-up views showing one example of a latch to hold the ends of the spindles in contact with the differential in the spindle assembly of FIGS. 4-8.
Figure 11:
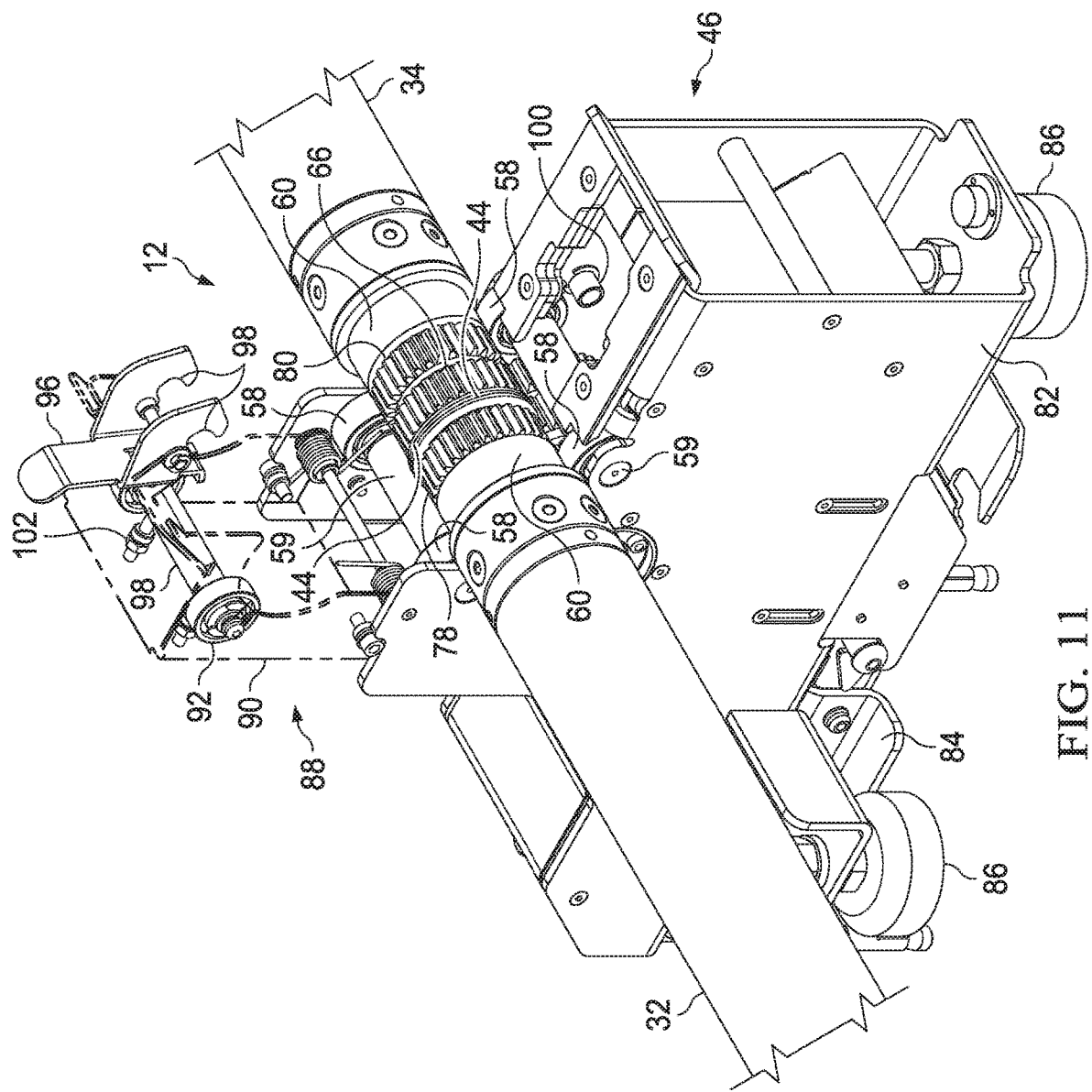
Figure 12:
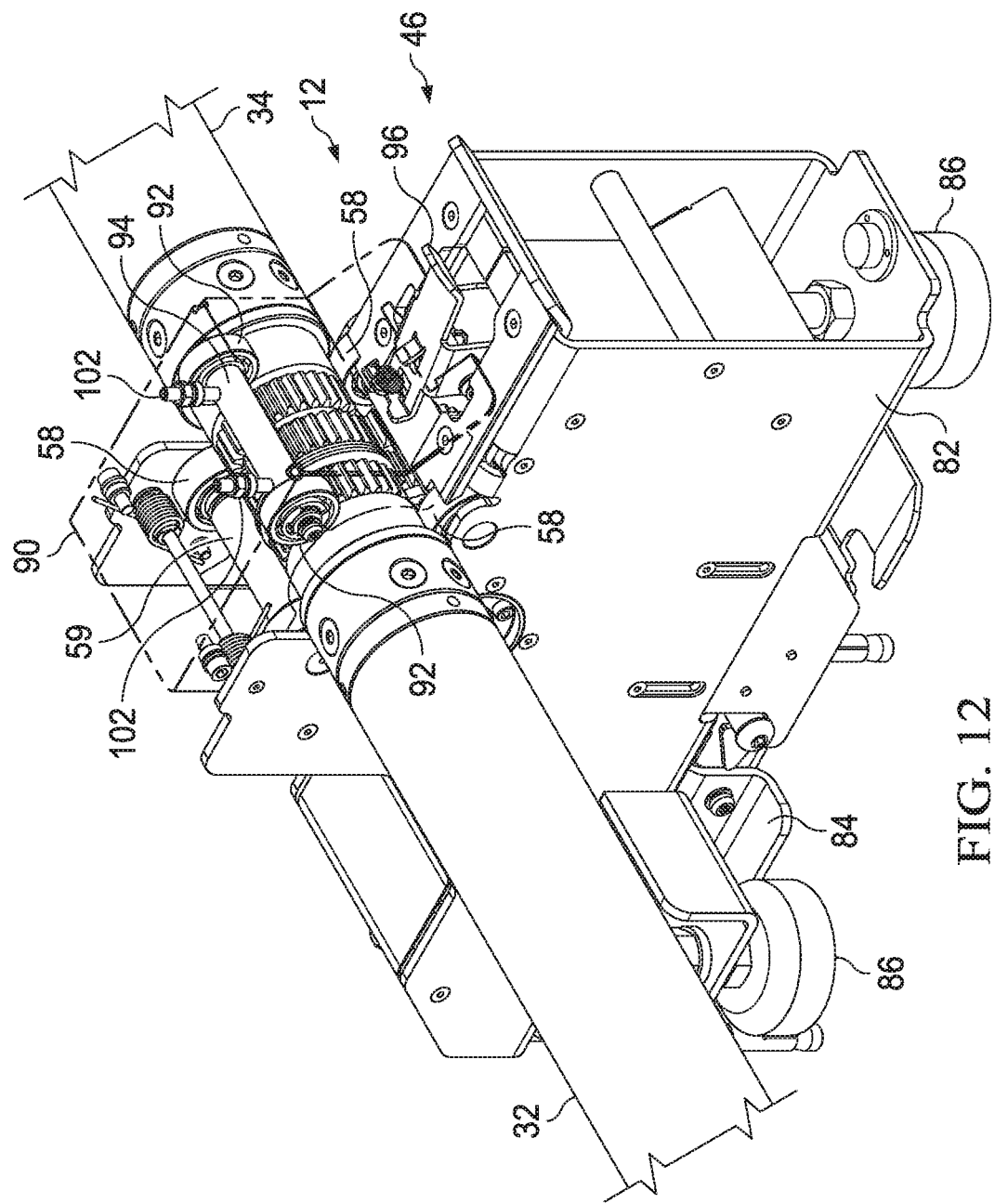
Figure 13:
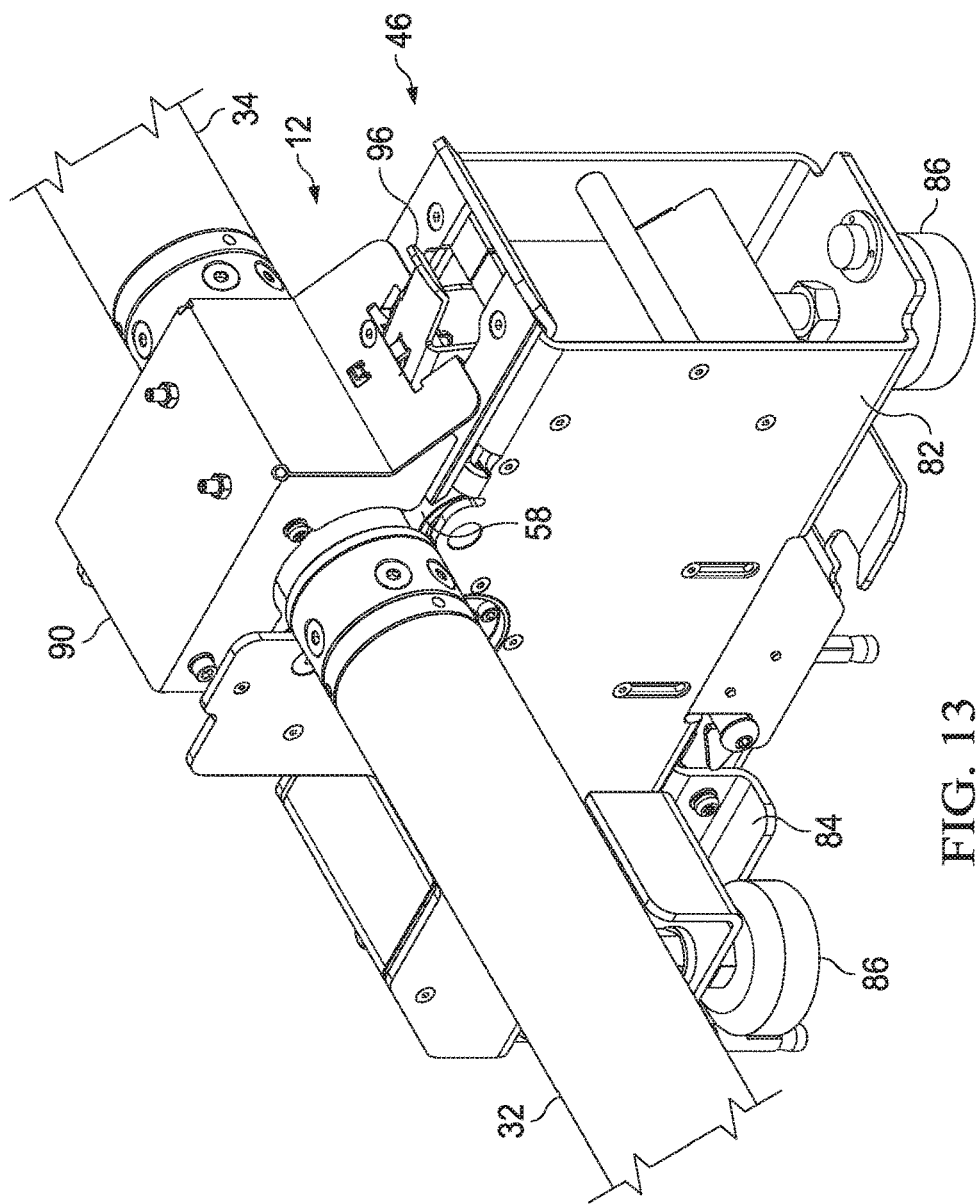

FIGS. 10-13 illustrate one example of a spindle assembly 12 in which support 46 includes a latch 88 to hold the ends 44 of spindles 32, 34 in contact with differential 48. FIG. 10 shows latch 88 open with spindle ends 44 out of in support 46. FIG. 11 shows latch 88 open with spindle ends 44 in support 46 engaging differential 48. FIGS. 12 and 13 shows latch 88 closed to hold spindle ends 44 in support 46 engaging differential 48. Referring to FIGS. 10-13, in the example shown, latch 88 is configured as an assembly that includes a cover 90, rollers 92 on axle 94 mounted to cover 90, and a fastener 96. Cover 90 is depicted in phantom lines in FIGS. 10-12 to not obscure the interior parts. Latch 88 is movable between an open position shown in FIGS. 10 and 11 in which spindles 32, 34 may be installed in and removed from support 46, and a closed position shown in FIGS. 12 and 13 in which each roller 92 bears against spindle bearing surface 60 to hold bearing surface 60 against rollers 58, and thus hold spindles gears 78, 80 in contact with differential output gears 70, 72.

Hooks 98 on fastener 96 engage pins 100 on support body 82 to fasten latch 88 in the closed position. The position of rollers 92 and thus the pressure on bearing surface 60 may be adjusted, for example, with a pair of set screws 102 connected between axle 94 and cover 90. Rollers 92 could also (or alternatively) be biased against bearing surface 60 with a spring or other suitable resilient biasing mechanism. Although a latch 88 usually will be desirable to help ensure continuous and robust contact between spindles 32, 34 and differential 48, it may be adequate in some implementations for spindles 32, 34 to rest on support 46 without a latch. Also, while a single latch to hold both spindles is shown, an individual latch for each spindle could be used.

Figure 14:
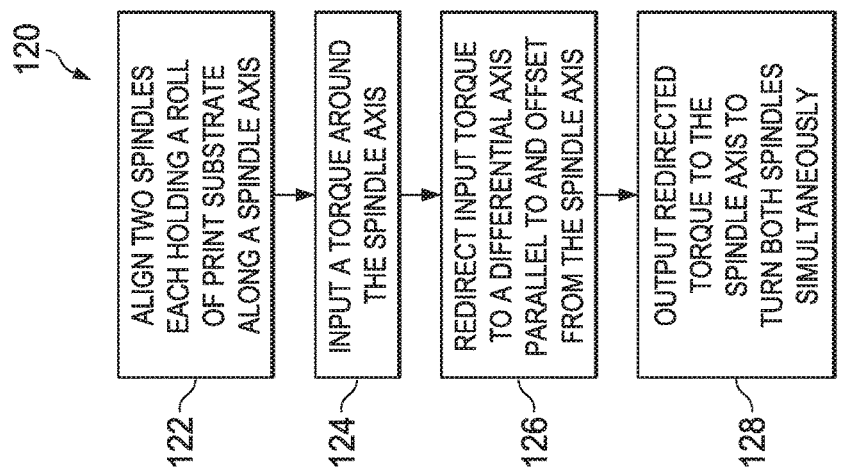
FIG. 14 is a flow diagram illustrating one example of a method for unwinding or winding multiple rolls of print substrate.

FIG. 14 is a flow diagram illustrating one example of a method 120 for unwinding or winding multiple rolls of print substrate, for example using spindle assembly 12. Referring to FIG. 14, two spindles each holding a roll of print substrate are aligned along a spindle axis (block 122). Then, a torque is input around the spindle axis (block 124) and redirected to a differential axis parallel to and offset from the spindle axis (block 126). Redirected torque is output to the spindle axis to turn both spindles simultaneously (block 128). The method may also include placing a roll of print substrate on each of the two spindles and then aligning the spindles along the spindle axis at block 122.

As noted at the beginning of this Description, the examples shown in the figures and described above illustrate but do not limit the invention. Other examples are possible. Therefore, the foregoing description should not be construed to limit the scope of the invention, which is defined in the following Claims.

What is claimed is:
1. A device for unwinding or winding multiple rolls of print substrate, the device comprising:
spindles each to hold a roll of print substrate, the spindles in line with one another lengthwise along a spindle axis;
spindle gears rotatable on the spindle axis; and
a differential operatively mounted along a differential axis offset from the spindle axis, the differential connected to a respective end of each spindle of the spindles, the differential to receive an input torque from a driveline along the spindle axis, redirect the input torque to a torque along the differential axis, and transmit an output torque based on the torque along the differential axis to turn the spindles on the spindle axis, wherein the differential comprises:
an input gear on the differential axis to receive the input torque from the driveline, and
output gears on the differential axis to transmit the output torque based on the torque along the differential axis to the spindle gears.

2. The device of claim 1, where each spindle of the spindles is disconnectable from the differential independently of any other spindle of the spindles.

3. The device of claim 2, comprising a support to support the differential and the respective end of each spindle of the spindles.

4. The device of claim 3, where each spindle of the spindles is removable from the support independently of any other spindle of the spindles.

5. The device of claim 4, where the support includes a latch to hold the end of each respective spindle of the spindles in the support, the latch movable between a closed position in which the end of the respective spindle cannot be removed from the support, and an open position in which the end of the respective spindle is removable from the support.

6. The device of claim 5, wherein the end of the respective spindle includes a bearing surface around the spindle axis, and the support includes multiple support rollers bearing on the bearing surface of the respective spindle to support the end of the respective spindle while allowing the respective spindle to rotate with respect to the support.

7. The device of claim 6, where the latch includes a roller bearing on the bearing surface of the respective spindle when the latch is in the closed position.

8. The device of claim 1, comprising the driveline aligned lengthwise with the spindle axis to provide the input torque to the differential.

9. The device of claim 8, where the driveline extends through a spindle of the spindles.

10. The device of claim 1, wherein the differential axis is parallel to and offset from the spindle axis.

11. The device of claim 1, wherein the spindles are co-axial along the spindle axis.

12. A printer comprising:
a mount to hold a pen for dispensing a printing fluid;
a spindle assembly to wind and unwind rolls of print substrate, the spindle assembly comprising:
spindles each to hold a respective roll of print substrate of the rolls of print substrate, the spindles co-axial along a spindle axis;
spindle gears rotatable on the spindle axis; and
a differential operatively mounted along a differential axis offset from the spindle axis, the differential connected to a respective end of each spindle of the spindles, the differential to receive an input torque from a driveline along the spindle axis, redirect the input torque to a torque along the differential axis, and transmit an output torque based on the torque along the differential axis to turn the spindles on the spindle axis, wherein the differential comprises:
an input gear on the differential axis to receive the input torque from the driveline; and
output gears on the differential axis to transmit the output torque based on the torque along the differential axis to the spindle gears.

13. The printer of claim 12, comprising the driveline aligned lengthwise with the spindle axis to provide the input torque to the differential.

14. The printer of claim 12, wherein the differential axis is parallel to and offset from the spindle axis.

15. The printer of claim 12, wherein each spindle of the spindles is disconnectable from the differential independent of any other spindle of the spindles.

16. The printer of claim 12, comprising a support to support the differential and the respective end of each spindle of the spindles.

17. The printer of claim 16, where each spindle of the spindles is removable from the support independent of any other spindle of the spindles.

* * * * *